Patented June 24, 1930

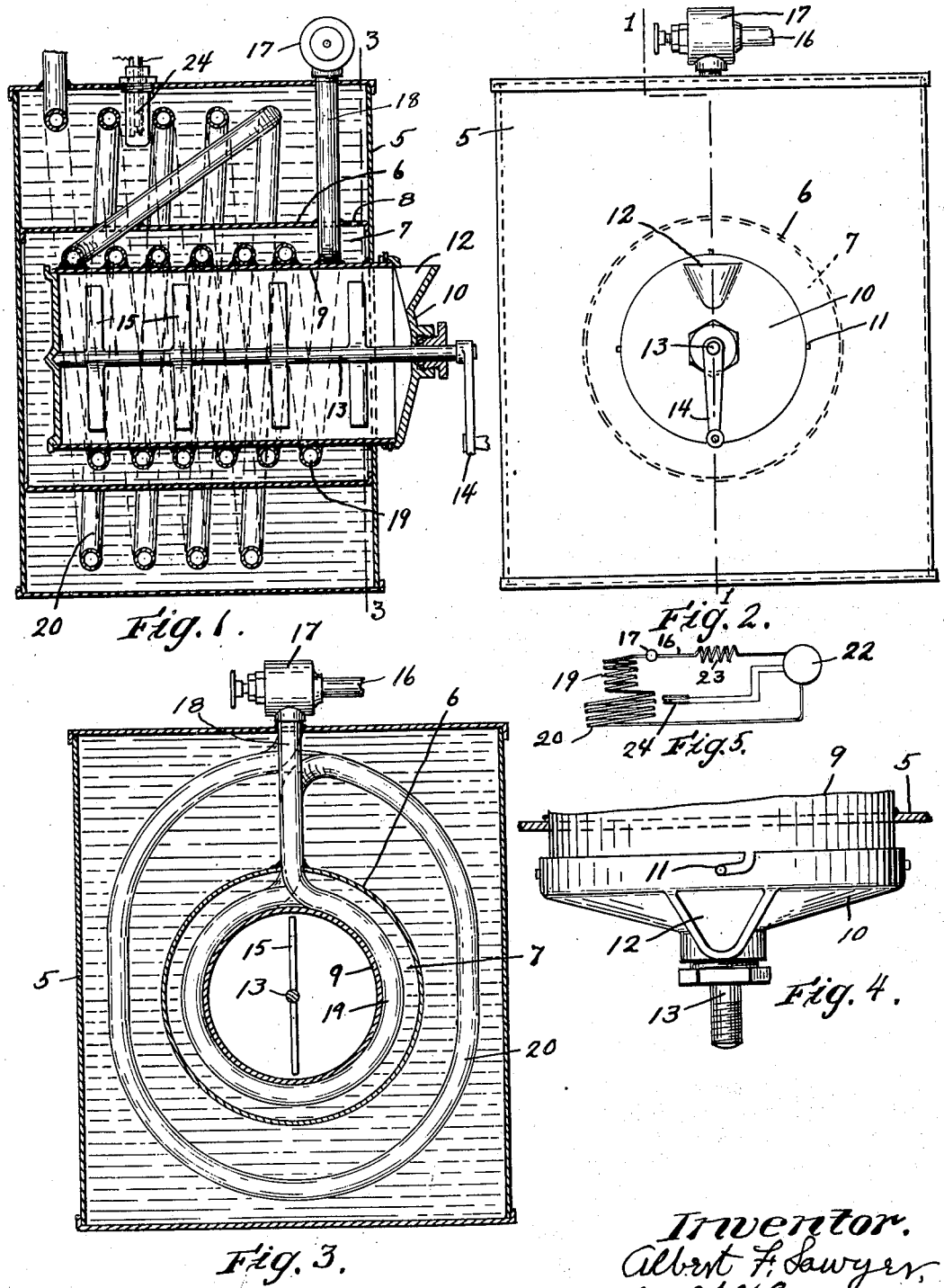

1,767,857

UNITED STATES PATENT OFFICE

ALBERT F. SAWYER, OF HAVERHILL, MASSACHUSETTS, ASSIGNOR TO IRVING L. KEITH, OF HAVERHILL, MASSACHUSETTS

COMBINED REFRIGERATING TANK AND ICE-CREAM FREEZER

Application filed October 30, 1928. Serial No. 316,084.

In the operation of a refrigerating system in connection with an ordinary domestic refrigerator in which the expansion coil is submerged in a liquid having a freezing point substantially below 32° F., usually water containing a high percentage of salt or alcohol, and for convenience herein termed "brine", it is customary to maintain the brine at temperatures ranging approximately from 15° to 20° F., so that the desired temperature in the refrigerator will be secured. This temperature is not sufficiently low to freeze the mixtures from which ice cream is ordinarily made and which, as a rule require temperatures at least as low as 10° F. for freezing, or reasonably rapid freezing.

The primary object of the invention is to associate an ice cream freezer with a domestic refrigerator cooling tank in such a manner that the necessary freezing temperature about the ice cream container may be secured, so that the freezing operation may be rapidly performed, while the exterior of the tank is maintained at the ordinary cooling temperature above referred to.

I accomplish this object in the manner hereinafter described, and as indicated in the accompanying drawing in which:

Fig. 1 is a sectional view of a refrigerating tank, embodying the invention, taken at the line 1—1 of Fig. 2.

Fig. 2 is a front elevation of the tank.

Fig. 3 is a sectional view at line 3—3 of Fig. 1.

Fig. 4 is a detail view of the ice cream container closure and

Fig. 5 is a diagram of the refrigerating system employed.

In the drawing a brine tank 5 of ordinary cubical shape is shown, and according to my invention I provide a cylindrical partition 6 therein, which extends from the front to the rear wall of the tank and provides a cylindrical chamber 7, which is separated from the main tank chamber, so that substantial circulation of the brine from one to the other is prevented, but for convenience, is in open communication therewith through a small opening, as 8, for convenience in filling.

A cylindrical shaped container 9 is mounted in the front wall of the tank, within, and in concentric relation with the partition 6, a soldered, or other form of liquid tight connection being provided between the wall of the tank and the container. Said container opens at its outer end to the exterior of the tank, and its inner end is preferably terminated somewhat short of the rear wall of the tank, so that the container walls may be exposed to the cooling action within the chamber 7 at all points except at its open end, which is arranged to protrude slightly beyond the front wall of the tank and is provided with a closure 10 having means for tightly connecting the same thereto, the means shown consisting of a common form of bayonet slot and pin connection 11. The closure is provided with a filling opening 12, so arranged that when the closure is in position, the liquid to be frozen may be conveniently poured therethru into the container. A dasher shaft 13, having a crank 14 on its outer end and mixing blades 5 thereon, is rotatably mounted in a suitable liquid tight bearing in the center of the closure 10.

A refrigerant inlet pipe 16 is connected to an expansion valve 17 and a pipe 18 which leads therefrom into the tank, and is connected to the inlet end of an expansion coil 19, which is arranged within chamber 7 and encircles the container 9 in close contact with its surface. For the purpose of increasing the conductivity between the coil and the container walls, the coils are soldered thereto at both sides, as indicated. From the outlet end of coil 19, a pipe is extended through the partition 6 into the main portion of the tank and is connected to a main expansion coil 20, which is arranged to encircle the partition 6, as indicated in Figs. 1 and 3.

As indicated in the diagram in Fig. 5, the discharge end of coil 20 is connected to a combined motor and compressor 22, which is, in turn, connected, thru a condenser 23, to inlet pipe 16, the common form of closed circuit, compressor, condenser, expander system being employed.

The brine which is placed in the tank and in the supplemental tank chamber 7 is a mixture, which, for reasons to be explained, has a freezing point approximately the same as the temperature to be maintained in said chamber 7, so that it will normally be in semi-frozen condition, or in a condition commonly called "slush ice".

A thermostat 24 is located in the tank and arranged to control the motor 22, so that a predetermined temperature, in practice, preferably from 15° to 20° F. will be maintained in said tank, exteriorly of chamber 7.

With the above described arrangement, the operation, so far as the maintaining of the brine in the main tank at a certain temperature is concerned will be normal.

As the refrigerant is conducted directly from the expansion valve to the supplemental coils 19 in chamber 7, they will be constantly completely filled with refrigerant in liquid form and maintained at the lowest temperature to which the refrigerant is reduced, and, as the brine in which the coils 19 are submerged is enclosed by the brine in the main tank, the temperature in which is maintained at a predetermined point, the temperature of the brine in the chamber will be reduced to a substantially lower temperature, approximately 10° lower in practice, than that in the main tank, the surface of which is exposed to air in the refrigerator.

By employing a brine in the tank having a freezing point at approximately the temperature which will normally be maintained in chamber 7, or about the container 9, the brine in said chamber will be maintained in a semi-frozen condition, so that semi-liquid or slush ice will be formed on and adjacent the coils 19, and on the surface of the container 9. As a result, a much more rapid absorption of the heat in the container 9 by the chamber which surrounds it will be secured than if a brine were employed which had a substantially lower freezing point. The reason for this more rapid absorption of heat is believed to be due to the fact that the soft ice has a greater degree of latent heat and better heat conductivity than would a liquid which has a lower freezing point.

In using the above described apparatus to freeze ice cream, the closure 10, will be secured in position on the container 9 with the dasher therein, and the liquid to be frozen will be poured into the container through the opening 12, and then the dasher will be rotated until the liquid is sufficiently frozen. The closure and dasher may then be removed and a similar closure, which is imperforate may be substituted if desired.

The location of the container 9 in the side of the tank and in a horizontal position is necessary when the refrigerator in which the tank is located opens at the front, but it would be located in the top of the tank, in a vertical position, in a refrigerator which opened at the top. The arrangement shown is believed to be the most convenient under ordinary conditions.

I claim:

1. A brine-receiving refrigerating tank having a container mounted in one of its walls and extending into the tank with its outer end opening to the exterior thereof, a partition disposed within the tank and arranged to enclose said container and provide a supplemental brine-receiving chamber surrounding said container, and separated from and surrounded by the brine in the main portion of the tank, a supplemental expansion coil in said chamber, a main expansion coil in said tank, exteriorly of said chamber, connected at its inlet end to the discharge end of said supplemental coil, and means for causing circulation of a refrigerant through said coils.

2. A brine-receiving refrigerating tank having a container mounted in one of its walls and extending into the tank with its outer end opening to the exterior thereof, a partition disposed within the tank and arranged to encircle said container and provide an annular brine-receiving chamber which encircles said container and is encircled by the brine in the tank, to permit the brine in said chamber to be maintained at a lower temperature than that in the main tank, a supplemental expansion coil encircling said container within said chamber and a main expansion coil connected at its inlet end to the discharge end of said supplemental coil and disposed within the tank, and means for circulating a refrigerant through said supplemental coil and said main coil successively.

3. A refrigerating tank having a cylindrically shaped partition therein extending from one of the walls thereof, a cylindrical container extending through said wall within said partition and having a closure for its outer end, an annular chamber being formed between said container and partition, a supplemental expansion coil encircling said container within said chamber and a main expansion coil encircling said partition within the tank, said coils being connected and arranged for circulation of the refrigerant through the supplemental and main coils successively.

4. A brine receiving refrigerating tank having an elongated container mounted at one end in one of its walls and opening at said end to the exterior thereof, a partition within the tank arranged to encircle said container and provide a supplemental brine-receiving chamber at its sides and inner end which is surrounded by the brine in the tank, so that substantial circulation of the brine between the chamber and main portion of the tank is prevented, a supplemental expansion coil in said chamber and a main expansion coil in said tank exteriorly of said partition arranged for circulation of the refrigerant through the supplemental coil and main coil successively, to maintain the brine in said chamber at a substantially lower temperature than that at which the brine in the tank is maintained.

5. A brine receiving refrigerating tank having an elongated container therein, opening at one end to the exterior of the tank through one side thereof, a partition within the tank arranged to encircle said container and forming a supplemental brine receiving chamber which encloses said container and is enclosed by and separated from the brine in the main portion of the tank, a supplemental expansion coil disposed within said chamber, and a main expansion coil disposed within the tank exteriorly of said chamber and connected at its inlet end to the discharge end of said supplemental coil, means for circulating refrigerant through said supplemental and main coils successively whereby the brine in said chamber may be maintained at a lower temperature than that in the main portion of the tank and means for maintaining the brine temperature in the main portion of the tank at a point which will maintain the brine in said chamber approximately at its freezing point.

In testimony whereof, I have signed my name to this specification.

ALBERT F. SAWYER.